(12) United States Patent
Ein-Eli et al.

(10) Patent No.: US 9,159,995 B2
(45) Date of Patent: Oct. 13, 2015

(54) SILICON-AIR BATTERIES

(75) Inventors: Yair Ein-Eli, Haifa (IL); Digby Donald MacDonald, State College, PA (US)

(73) Assignees: Technion Research & Development Foundation Limited, Haifa (IL); The Penn State Research Foundation, University Park, PA (US)

( * ) Notice: Subject to any disclaimer, the term of this patent is extended or adjusted under 35 U.S.C. 154(b) by 428 days.

(21) Appl. No.: 13/510,940

(22) PCT Filed: Feb. 11, 2010

(86) PCT No.: PCT/IL2010/000125
§ 371 (c)(1),
(2), (4) Date: May 20, 2012

(87) PCT Pub. No.: WO2011/061728
PCT Pub. Date: May 26, 2011

(65) Prior Publication Data
US 2012/0299550 A1    Nov. 29, 2012

Related U.S. Application Data

(60) Provisional application No. 61/262,561, filed on Nov. 19, 2009.

(51) Int. Cl.
*H01M 6/04*      (2006.01)
*H01M 4/38*      (2006.01)
*H01M 12/06*    (2006.01)

(52) U.S. Cl.
CPC .............. *H01M 4/38* (2013.01); *H01M 12/06* (2013.01); *H01M 2300/002* (2013.01)

(58) Field of Classification Search
CPC ....................................... H01M 10/05
USPC ........... 429/212, 218.1, 231.8, 231.9, 231.95, 429/405, 484–485, 523, 188, 302, 403
See application file for complete search history.

(56) References Cited

U.S. PATENT DOCUMENTS

| | | | |
|---|---|---|---|
| 3,513,031 A | | 5/1970 | Zaromb |
| 4,913,983 A | | 4/1990 | Cheiky |
| 6,878,668 B1 | * | 4/2005 | Schwartz et al. ............. 502/247 |
| 2004/0126659 A1 | | 7/2004 | Graetz et al. |
| 2004/0241537 A1 | | 12/2004 | Okuyama et al. |
| 2005/0175894 A1 | * | 8/2005 | Visco et al. .................... 429/212 |
| 2008/0214428 A1 | * | 9/2008 | Orlich et al. ................... 510/405 |
| 2009/0061315 A1 | * | 3/2009 | Nakano et al. ............. 429/218.1 |
| 2009/0239113 A1 | | 9/2009 | Hase et al. |

(Continued)

FOREIGN PATENT DOCUMENTS

| WO | WO 00/44057 | 7/2000 |
|---|---|---|
| WO | WO 2010/100636 | 9/2010 |

OTHER PUBLICATIONS

International Preliminary Report on Patentability Dated Sep. 15, 2011 From the International Bureau of WIPO Re. Application No. PCT/IL2010/000127.

(Continued)

*Primary Examiner* — Paul Dinh

(57) ABSTRACT

Silicon-oxygen batteries comprising a silicon anode as chemical fuel, an air-cathode for dissociating oxygen and a non-aqueous electrolyte, and applications using the same are provided. The silicon-batteries may utilize air for generating oxygen.

54 Claims, 3 Drawing Sheets

(56) References Cited

U.S. PATENT DOCUMENTS

2009/0241311 A2* 10/2009 Naito et al. .................. 29/25.03
2010/0266901 A1* 10/2010 Johnson ..................... 429/231.8
2011/0318657 A1 12/2011 Ein-Eli et al.

OTHER PUBLICATIONS

International Search Report and the Written Opinion Dated Jul. 5, 2010 From the International Searching Authority Re.: Application No. PCT/IL2010/000127.
International Search Report and the Written Opinion Dated May 18, 2010 From the International Searching Authority Re.: Application No. PCT/IL2010/000125.
Abelev et al. "Enhanced Copper Surface Protection in Aqueous Solutions Containing Short-Chain Alkanoic Acid Potassium Salts", Langmuir, 23: 11281-11288, 2007.
Abelev et al. "Potassium Sorbate—a New Aqueous Copper Corrosion Inhibitor Electrochemical and Spectroscopic Studies", Electrochimica Acta, 52: 1975-1982, 2007.
Abelev et al. "Potassium Sorbate Solutions as Copper Chemical Mechanical Planarization (CMP) Based Slurries", Electrochimica Acta, 52: 5150-5158, 2007.
Cohn et al. "Silicon-Air Batteries", Electrochemistry Communications, XP026685102, 11(10): 1916-1918, Oct. 1, 2009.
Ein-Eli et al. "Food Preservatives Serving as Nonselective Metal and Alloy Corrosion Inhibitors", Electrochemical and Solid-State Letters, 9: B5-B7, 2006.
Ein-Eli et al. "Review on Copper Chemical—Mechanical Polishing (CMP) and Post-CMP Cleaning in Ultra Large System Integrated (ULSI)—An Electrochemical Perspective", Electrochimica Acta 52: 1825-1838, 2007.
Pickett "Optimization of A Silicon-Air Fuel Cell, Writing Samples, XP002580544, Retrieved From the Internet, Jan. 29, 2005. & "Index of Pickett/Resume, XP002585963, Jan. 29, 2005. & "Resume", XP002585964, Jan. 29, 2005.
International Preliminary Report on Patentability Dated May 31, 2012 From the International Bureau of WIPO Re. Application No. PCT/IL2010/000125.
Official Action Dated Aug. 6, 2013 From the US Patent and Trademark Office Re. U.S. Appl. No. 13/254,171.
Notice of Allowance Dated May 14, 2014 From the US Patent and Trademark Office Re. U.S. Appl. No. 13/254,171.
Restriction Official Action Dated Mar. 12, 2013 From the US Patent and Trademark Office Re. U.S. Appl. No. 13/254,171.
Official Action Dated Jan. 24, 2014 From the US Patent and Trademark Office Re. U.S. Appl. No. 13/254,171.
Communication Pursuant to Article 94(3) EPC Dated Nov. 12, 2014 From the European Patent Office Re. Application No. 10708651.4.

* cited by examiner

SILICON-AIR BATTERIES

RELATED APPLICATIONS

This application is a National Phase of PCT Patent Application No. PCT/IL2010/000125 having International filing date of Feb. 11, 2010, which claims the benefit of priority of U.S. Provisional Patent Application No. 61/262,561 filed on Nov. 19, 2009. The contents of the above applications are all incorporated herein by reference.

FIELD AND BACKGROUND OF THE INVENTION

The present invention, in some embodiments thereof, relates to energy conversion, and more particularly, but not exclusively, to electrochemical cell systems which utilize air and which can be utilized for forming batteries and fuel cells, and to applications of such batteries and fuel cells.

The continuous search for clean, sustainable and cost-effective source of energy has pushed materials and electrochemical sciences to development of new materials and technologies for portable power sources. The prime objectives include reducing the size of the power source and at the same time increasing its energy or power density, along-side of reducing cost and toxic hazards while increasing safety and ease of use thereof.

Electrochemical cell devices, referred to in the art as "batteries", are composed of one or more electrochemical or voltaic cells, which store chemical energy and provide it as available electricity due to a potential difference between its electrodes. Types of electrochemical cells include galvanic cells, electrolytic cells, fuel cells, flow cells, and voltaic cells, each comprising two half-cells: one for the oxidation reaction of the chemical fuel (negative electrode or anode) and one for the reduction reaction of the oxidant (positive electrode or cathode). Batteries generate electricity without combustion of the fuel and oxidizer. As opposed to what occurs with other methods of electricity generation, the chemical energy is converted into electrical current and some heat, driven by the redox potential difference between the two halves of the cells. Batteries are therefore typically characterized by having a positively charged anode, a negatively charged cathode, an ion-conducting material referred to as an electrolyte, and conducting negative and positive terminals which conduct the resulting electric current in and out of an electric circuit.

A fuel cell (FC) is a particular type of electrochemical cell device (battery) that continuously converts chemical energy directly to electrical energy as long as a fuel (commonly hydrogen, hydrogen-generating compounds or metallic anode material) and an oxidant (commonly oxygen) are supplied. Fuel cells are characterized by high efficiency compared to internal combustion engines. In addition, fuel cells are ecologically friendly and can function under a wide range of physical conditions.

The development of fuel cells is one of the main directions in the field of new power engineering. Several types of fuel cells based on $H_2/O_2$, $NaBH_4/H_2O_2$, phosphoric acid, molten carbonate, direct methanol and solid oxide were developed in the last two decades. However, these electrochemical cell devices are still far from mass production due to multiple practical limitations.

Metal-air batteries have been attracting the electrochemistry research and development community for the last fifty years. Their attractiveness lies in the principle that the cathodic reaction is a catalyzed reduction of oxygen consumed from ambient air rather than oxygen stored in the system. The air battery using the oxygen in air as a positive electrode active material does not require any space for incorporating the active material, and is hence expected to have a high capacity. This aspect results in high energy densities (measured in watt-hour, or Whr) and high specific energies (measured in watt-hour per kilogram, or Whr/kg) for the metal-air batteries.

The general structure of a metal-air battery, such as a lithium-air secondary battery, includes a catalyst layer, an air positive electrode (cathode), a negative electrode (anode), a polymer electrolyte film interposed between the anode and cathode, and an oxygen permeation film laminated on the air cathode. The air cathode may contain, for example, a polymer electrolyte film comprising polyacrylonitrile, ethylene carbonate, propylene carbonate, and $LiPF_6$, which is press-bonded to a nickel or aluminum mesh. Alternatively, the cathode is formed of a lithium foil, and this four-layer laminated body is sealed in a laminate bag. The catalyst layer for ionizing the oxygen in the ambient air can be made, for example, of acetylene black (a form of carbon black which is a fine black powder of amorphous carbon obtained by the incomplete combustion of hydrocarbons) containing cobalt.

Most metal-air batteries, including Zn-air, Al-air and Fe-air utilize aqueous alkaline solutions, mainly potassium hydroxide (KOH), due to the high conductivity of such electrolyte and the superb ability to regulate the reduced oxygen ion into hydroxide anions. Zn-air batteries has received broad attention in the 1960's and 1970's, with the development of commercialized primary cells, in coin type structure, for hearing aids operation, although in the last ten years there has been an enormous effort to construct large scale Zn-air batteries for electric vehicles.

The Al-air couple has higher theoretical densities compared to its competitors (Zn-air and Fe-air) and was under investigation as a suitable power source for vehicles and some stationary applications. However, high open circuit corrosion rates lead to the consumption of the Al metal anode without any usable power output.

The lithium-air battery presents the highest theoretical specific energy value (11,246 Whr/kg). Although theoretically high energy density is expected from a lithium-air cell system, nontrivial challenges associated with a practical lithium-air cell exist. For example, lithium suffers from severe corrosion in alkaline electrolytes and safety concerns are still unresolved with aqueous systems. In addition, lithium-air cells are sensitive to anode passivation due to air/moisture contamination, the operating current density is typically very low (less than 100 $\mu A/cm^2$). In 1996, researchers reported a conducting polymer electrolyte based secondary lithium-air battery. This battery showed open circuit potential (OCP) of about 3 V and working voltage in the range of 2 to 2.8 V. However, good coulombic efficiency was kept for only a few cycles.

Overall, the majority of these electrochemical cell technologies suffer from a range of drawbacks, such as size-, weight- and capacity limitations, hazardous and/or toxic components and by-products, and cost effectiveness over the entire life-cycle of the device including environmentally safe disposal. Other obstacles associated with electrochemical cell device development include complex electrode and cell design, catalysts poisoning and mechanical instability, high catalyst cost, low potential and slow oxidation kinetic.

It is know that silica undergoes rapid corrosion when in contact with aqueous alkaline solutions such as a KOH solution [Seidel, H. et a, *J. Electrochem. Soc.*, 137 (1990) 3626, and Glembocki, O. J. et al., *J. Electrochem. Soc.*, 138 (1991) 1055], a trait which has served the semiconductor industry for years for silicon etching.

Additional background art includes U.S. Pat. No. 4,943, 496 and U.S. Patent Application Nos. 20060255464, 20080096061, 20090208791 and 20090208792.

SUMMARY OF THE INVENTION

The present inventor designed and successfully practiced an electrochemical cell based on a silicon-oxygen redox couple, which harnesses the energy potential in the process of turning silicon to silicon dioxide to generate electricity, while utilizing non-aqueous electrolytes.

Hence, according to an aspect of some embodiments of the present invention, there is provided a battery which includes an anode, a cathode, a non-aqueous electrolyte and an electric conduit to allow electric current flow between the cathode and the anode, wherein the anode includes silicon as fuel, and the cathode includes oxygen as an oxidant.

In some embodiments, the oxygen is derived from ambient air.

In some embodiments, the silicon is amorphous silicon.

In some embodiments, the silicon is in a form of a single crystal wafer.

In some embodiments, the orientation of the crystal is selected from the group consisting of silicon [100] crystal orientation, silicon [111] crystal orientation and silicon [101] crystal orientation.

In some embodiments, the silicon includes a dopant.

In some embodiments, the dopant is selected from the group consisting of antimony, phosphorus, arsenic, boron, aluminum and gallium.

In some embodiments, the dopant is selected from the group consisting of a p-type dopant and an n-type dopant.

In some embodiments, the silicon is doped degenerately.

In some embodiments, the silicon is in a form of a powder.

In some embodiments, the silicon is in a form of an alloy which includes at least one metal in an amount that ranges from 1 to 99 percents by weight of the anode.

In some embodiments, the silicon powder further includes a powder of at least one metal in an amount that ranges from 1 to 99 percents by weight of the anode.

In some embodiments, the silicon powder is of an alloy which includes silicon and at least one metal in an amount that ranges from 1 to 99 percents by weight.

In some embodiments, the metal is selected from the group consisting of iron, lithium, sodium, magnesium, copper, nickel, zinc, aluminum, germanium, gallium, silver and manganese.

In some embodiments, the non-aqueous electrolyte is selected from the group consisting of an ionic liquid, a mixture of non-ionic polar solvent and cations and anions, a conductive polymer, a ceramic oxide and combinations thereof.

In some embodiments, the non-ionic polar solvent is selected from the group consisting of an alkylnitrile solvent, a nitroalkane solvent, diethylether, dimethoxyethane, tetrahydrofuran, dioxane, dioxolane, methyltetrahydrofuran, methyl formate, ethyl formate, methyl propionate, propylene carbonate, ethylene carbonate, dimethyl carbonate, diethyl carbonate, ethylmethyl carbonate, dibutyl carbonate, butyrolactones, acetonitrile, benzonitrile, nitromethane, nitrobenzene, dimethylformamide, N-methylpyrolidone, dimethylsulfone, tetramethylene sulfone, sulfolane and thiophene.

In some embodiments, the non-aqueous electrolyte comprises a cation, and the cation is selected from the group consisting of an alkylammonium and a haloalkylammonium.

In some embodiments, the non-aqueous electrolyte comprises an anion, and the anion has the general formula [F(FH)n]-, whereas n is an integer ranging from 1 to 4.

In some embodiments, the cation in the ionic liquid is selected from the group consisting of an alkali metal cation, an alkaline earth metal cation, substituted or a unsubstituted imidazolium, a substituted or unsubstituted morpholinium, a substituted or unsubstituted oxazolium, a substituted or unsubstituted piperidinium, a substituted or unsubstituted pyrazinium, a substituted or unsubstituted pyrazolinium, a substituted or unsubstituted pyrazolium, a substituted or unsubstituted pyridazinium, a substituted or unsubstituted pyridinium, a substituted or unsubstituted pyrimidinium, a substituted or unsubstituted pyrrolidinium, a substituted or unsubstituted thiazolium, a substituted or unsubstituted triazolium, a substituted or unsubstituted 1,2,4-triazolinium, a substituted or unsubstituted 1,2,3,4-tetrazolinium, phosphonium, sulfonium, uronium, guanidinium, 3-alkyl-1-methylimidazolium, 1-alkylpyridinium, N-methyl-N-alkylpyrrolidinium, 1-methyl-4-alkyl-1,2-triazolinium, 1-methyl-(2, 3 or 4)-alkyltetrazolinium and tetraalkylammonium.

In some embodiments, the anion in the ionic liquid is selected from the group consisting of an anion having the general formula [F(FH)n]-, whereas n is an integer ranging from 1 to 4, a perfluoro-1,1-dimethylpropyl alkoxide, a mono-perfluorosulfonate, a di-perfluorosulfonate, (CF3)2PF4-, (CF3)3PF3-(CF3)4PF2-, (CF3)5PF—, (CF3)6P—, SF5CF2SO3-, SF5CHFCF2SO3-, (CF3 SO2)2CH—, (SF5)3C— and (O(CF3)2C2(CF3)2O)2PO—.

In some embodiments, the ionic liquid is 1-ethyl-3-methylimidazolium:(HF)2F:(HF)3F ("EMI.(HF)2.3F").

In some embodiments, the non-aqueous electrolyte further includes fluoride. In some embodiments, the fluoride is at a concentration ranging from 0.001 to 50 percents by weight of the electrolyte.

In some embodiments, the non-aqueous electrolyte further includes water. In some embodiments the water is at a concentration ranging from 0.001 to 95 percents by weight of the electrolyte.

In some embodiments, the non-aqueous electrolyte further includes silicic acid. In some embodiments, the silicic acid is at a concentration ranging from 0.001 to 70 percent by weight of the electrolyte.

In some embodiments, the fluoride is selected from the group consisting of HF, NH4F and KF.

In some embodiments, at least one of the anode and the cathode includes a catalyst layer.

In some embodiments, the cathode includes a catalyst layer, and, in some embodiments, the catalyst is selected from the group consisting of palladium, platinum, nickel, cobalt, iron, manganese, an oxide thereof, a carbonaceous material, and any combination thereof.

In some embodiments, the cathode is an air cathode.

In some embodiments, the cathode is having a configuration selected from the group consisting of a plate, a fibrous, a mesh, a rod, a tubular body, a sintered type cathode (having a sintered type body), or a foamed type cathode (having a foamed type body).

In some embodiments, the cathode includes a catalyst. In some embodiments, the catalyst is capable of accelerating dissociation of molecular oxygen.

In some embodiments, the cathode further includes a carbonaceous material.

In some embodiments, the battery presented herein further includes a device capable of increasing flow of the oxygen.

In some embodiments, the device capable of increasing flow of the oxygen is selected from the group consisting of a pump, a fan, a ventilator a high-pressure container and a tube.

According to another aspect of some embodiments of the present invention, there is provided an electricity-consuming device, powered by the battery presented herein.

According to another aspect of some embodiments of the present invention, there is provided a method of powering an electricity-consuming device, the method includes powering the electricity-consuming device with the battery presented herein.

In some embodiments, the electricity-consuming device is selected from the group consisting of microelectromechanical systems (MEMS), an autonomous sensor, an autonomous medical device, an illumination device, an autonomous electromechanical device, an electric vehicle, an uninterrupted power supply device and an electricity storage device.

According to another aspect of some embodiments of the present invention, there is provided a portable power source which includes the battery presented herein.

As used herein the term "about" refers to ±10%.

The terms "comprises", "comprising", "includes", "including", "having" and their conjugates mean "including but not limited to". The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings and images. With specific reference now to the drawings and images in detail, it is stressed that the particulars shown are by way of example and for purposes of illustrative discussion of embodiments of the invention. In this regard, the description taken with the drawings and images makes apparent to those skilled in the art how embodiments of the invention may be practiced.

In the drawings.

DESCRIPTION OF EMBODIMENTS OF THE INVENTION

Figure 1:
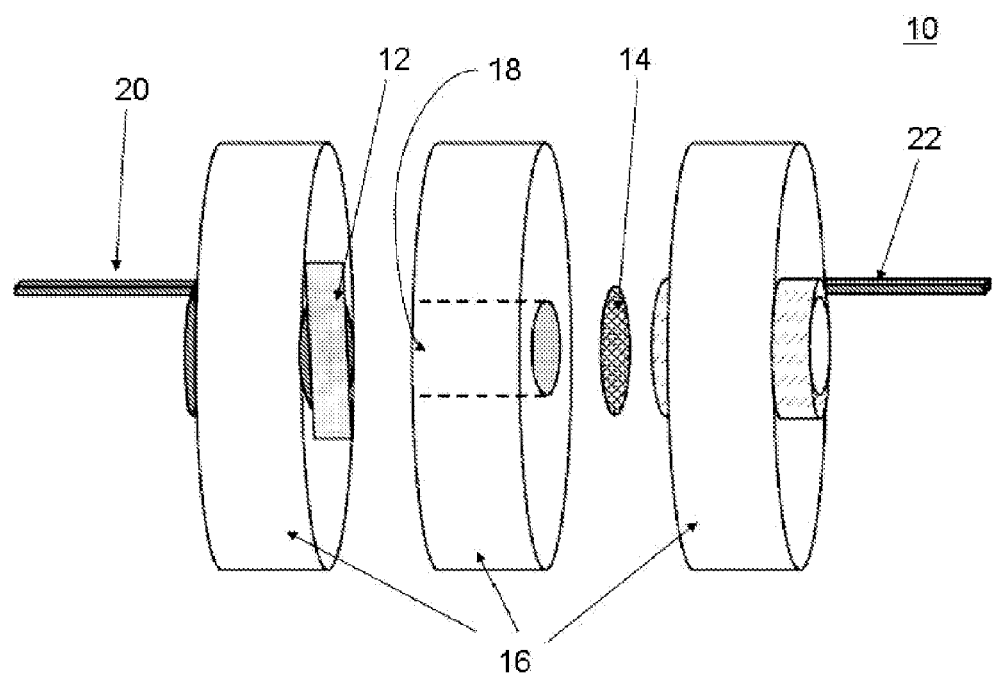
FIG. 1 presents a schematic illustration of an exemplary prototype of silicon-air battery 10, according to some embodiments of the invention, wherein silicon wafer anode 12 and nickel mesh air cathode 14 are in contact with RTIL electrolyte 18, and contained in polypropylene disc 16 fitted with negative terminal 20 and positive terminal 22.

The present invention, in some embodiments thereof, relates to energy conversion, and more particularly, but not exclusively, to electrochemical cell system which utilizes air and which can be utilized for forming batteries and fuel cells, and to applications of such batteries and fuel cells.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

According to an aspect of some embodiments of the present invention, there is provided a battery which comprises an anode, a cathode, a non-aqueous electrolyte and an electric conduit to allow electric current flow between said cathode and said anode, said anode comprising silicon as fuel, and said cathode comprising oxygen as an oxidant.

The battery described herein utilizes silicon as an electrochemical fuel, air a source of oxidant, and a non-aqueous aqueous electrolyte. Without being bound by any particular theory, it is assumed that a silicon/oxygen couple undergoes an electrochemical redox reaction to give silicon dioxide, according to the following postulated scheme:

Anode: $Si+6OH^- \rightarrow Si(OH)_6^{2-}+4e^-$ ($E_0=-1.75$ V) (1)

Electrolyte: $Si(OH)_6^{2-} \rightarrow SiO_2+2H_2O+2OH^-$ (2)

Cathode: $O_2+2H_2O+4e^- \rightarrow 4OH^-$ ($E_0=0.4$ V) (3)

Overall: $Si+O_2 \rightarrow SiO_2$ ($E_0=2.15$ V) (4)

As discussed hereinabove, metal-air batteries have been investigated. Currently, the most widely used electrolyte in such batteries is an alkaline electrolyte such as KOH. While it is well known that silicon corrodes rapidly in the presence of aqueous alkaline electrolyte [Seidel, H. et a, *J. Electrochem. Soc.*, 137 (1990) 3626, and Glembocki, O. J. et al., *J. Electrochem. Soc.*, 138 (1991) 1055] the constructions and operation of a silicon-air battery as described herein is non-trivial.

While reducing the present invention to practice, it was surprisingly uncovered that the performance of silicon wafers as anodic materials in a prototype of a conventional metal-air battery, comprising a silicon anode, and an air cathode Can be substantially improved while utilizing a non-aqueous electrolyte.

As demonstrated in the Examples section that follows, the present inventor has demonstrated that such silicon-air fuel cells are feasible, and moreover, exhibit a remarkable discharge period.

In the context of the present embodiments, the term "battery" refers to an electrochemical cell device in the general sense, consisting of one or more electrochemical or voltaic cells, which store chemical energy and provide it as available electricity due to a potential difference between its electrodes. Types of electrochemical cells include galvanic cells, electrolytic cells, fuel cells, flow cells, and voltaic cells, each comprising two half-cells: one for the oxidation reaction of the chemical fuel (negative electrode or anode) and one for the reduction reaction of the oxidant (positive electrode or cathode). Batteries generate electricity without combustion of the fuel and oxidizer. As opposed to what occurs with other methods of electricity generation, the chemical energy is converted into electrical current and some heat, driven by the redox potential difference between the two halves of the cells. Batteries are therefore characterized by having a positively charged anode, a negatively charged cathode, an ion-conducting material referred to as an electrolyte, and conducting negative and positive terminals which conduct the resulting electric current in and out of an electric circuit.

The term "fuel-cell", as used herein, refers to one type of an electrochemical cell device, or battery, which continuously converts chemical energy directly to electrical energy as long as a fuel and an oxidant are supplied. Electricity is generated through the reaction, triggered in the presence of an electrolyte, between the fuel (on the anode side) and an oxidant (on the cathode side), which flow into the cell, while the electrolyte remains in the cell. Fuel cells can operate virtually continuously as long as the necessary aforementioned flows are maintained.

Fuel cells are different from conventional electrochemical cell batteries, in that they consume reactant from an external source, which must be replenished, therefore constitute a thermodynamically open system, while conventional cells store electrical energy chemically and hence represent a thermodynamically closed system.

According to some embodiments of the invention, the battery described herein uses silicon as fuel is a silicon-air battery, such that oxygen from ambient air is consumed as the oxidant at the cathode.

Referring now to the drawings, FIG. 1 presents a schematic illustration of an exemplary prototype of silicon-air battery 10, wherein silicon wafer anode 12 and nickel mesh air cathode 14 are in contact with RTIL electrolyte 18, and contained in polypropylene disc 16 fitted with negative terminal 20 and positive terminal 22.

According to some embodiments, the anode comprises amorphous silicon, as this substance is known in the art.

According to some embodiments of the invention, the anode comprises silicon in macroscopic crystalline form, otherwise known as a single crystal wafer from, as this term is used in the field of material science, electrochemistry and electronic industry.

As known in the art, single crystal wafers are characterized by a crystal orientation. The phrase "crystal orientation", as used herein, refers to a physico-mechanical property of silicon wafers which are grown from a single crystal and having a regular crystal structure. Since silicon has a diamond cubic structure, when cut into wafers, the surface is aligned in one of several relative directions known as crystal orientations, which are defined by the Miller index with [100], [111] or [101] faces being the most common for silicon. Crystal orientation is a significant property since many of a single crystal's structural and electronic properties are highly anisotropic. For example, ion implantation depths (doping) which effects conductivity, depend on the wafer's crystal orientation, since each direction offers distinct paths for transport.

Since the operation of a silicon-air fuel cell is correlated also to the conductivity of the silicon anode, the crystal orientation of the silicon plays a role in this correlation, thus, according to some embodiments of the present invention, the orientation of the silicon crystal can be, for example, the [100] crystal orientation, the [111] crystal orientation and the [101] crystal orientation.

According to the terms used in the field, an electric current in silicon is generated by the movement of electrons (negative charges) or "holes" (positive charges) through the silicon crystal lattice, going from one lattice defect to the next. According to some embodiments of the invention, the silicon crystal can be pristine (minimal occurrences of lattice defects) or doped (being intentionally endowed with crystal defects), as these terms are known in the art. As used herein, the term "p-doping" refers to doping of a semiconductor with a substance ("dopant") which is capable of accepting weakly-bound outer electrons from the semiconductor material. Thus p-doping, wherein "p" denotes positive, is a process of doping a semiconductor with an acceptor material, or p-type dopant, which forms "holes", or positive charges, in the semiconductor. As used herein, the term "n-doping" refers to doping of a semiconductor with a substance ("dopant") which is capable of donating weakly-bound outer electrons to the semiconductor material. Thus n-doping, wherein "n" denotes negative, is a process of doping a semiconductor with a donor material, or n-type dopant, which donates electrons to the semiconductor.

It is to be noted that in some occurrences in the literature, the term "doped" or "doping" in the context of silicon crystals and other semiconductors, denote mixing of small amounts of one substance into a bulk of another substance without effecting a specific augmentation of electrical conductivity but rather effect color, morphology, ion transfer and other physicochemical phenomena. However, the term "doping", as used herein and is known in the art, exclusively refers to the protocol of electrical doping where the doping results in the enhancement of charge carrier density in the doped semiconductor material, such as silicon, which augments its capacity to carry an electrical current, as opposed to general "mixing" or "coating" where no electrical doping occurs.

The presence of electrons or holes, which are termed n-type or p-type semiconductor material, respectively, is the basis for any conductivity of silicon. Thus, doping of silicon (the addition of dopants to silicon crystals) may render the latter so as to conduct electricity nearly as well as some metals. Depending on the kind of dopant, doped silicon is altered in the number of electrons or holes. The term "n" is used for n-type dopant, and the term "p" is used for p-type dopant.

According to some embodiments of the present invention, the silicon crystal wafer used as the anode in the silicon-air batteries presented herein, comprises a dopant, which can be a p-type dopant and an n-type dopant.

The level of doping depends upon the type of semiconductor and its intended use. Lightly- and moderately-doped semiconductors are referred to as extrinsic, while a semiconductor doped to such high levels that render it more like a conductor than a semiconductor, is referred to as degenerate. When a comparatively small number of dopant atoms are added, on the order of one per 100 million atoms, the doping is said to be low or light. When many more dopant atoms are added, on the order of one per ten thousand atoms, the doping is referred to as heavy or high. This is often shown as n+ and n++ for n-type doping or p+ and p++ for p-type doping.

In general, an increase in doping concentration affords an increase in conductivity due to the higher concentration of carriers available for conduction. Degenerately (very highly) doped semiconductors have conductivity levels comparable to metals and are often used in modern integrated circuits as a replacement for metal. It is noted herein that even degenerate levels of doping imply low concentrations of impurities with respect to the base semiconductor. In crystalline intrinsic (un-doped) silicon, there are approximately $5 \times 10^{22}$ atoms/cm$^3$, and doping concentration for silicon semiconductors may range anywhere from $10^{13}$ atoms/cm$^{-3}$ to $10^{18}$ atoms/cm$^{-3}$. Doping concentration above about $10^{18}$ atoms/cm$^{-3}$ is considered degenerate (heavy doping) at room temperature. Degenerately doped silicon contains a proportion of impurity to silicon in the order of parts per thousand. This proportion may be reduced to parts per billion in very lightly doped silicon. Doping concentration values fall within this range and are selected to produce the desired properties in the device that the semiconductor is intended for.

According to some embodiments of the present invention, the anode silicon wafer is heavily-doped, or in the terms of the art, it is doped degenerately so as to conduct almost like some metal. Non-limiting examples for dopants which can be used in the context of the present embodiments include antimony, phosphorus and arsenic as donors (n-type) dopants of silicon, and boron, aluminum and gallium as acceptors (p-type) dopants.

In order to augment the electric properties of the silicon anode, one or more metals can be incorporated therein. According to some embodiments of the invention, the anode can be made of a metal alloy of silicon, having from 1 to 99 percent by weight of at least one metal. The metal(s) can be any metal, including alkali metals such as lithium, sodium, potassium, rubidium, caesium and francium, alkaline earth metals such as beryllium, magnesium, calcium, strontium, barium, radium, transition metals such as zinc, molybdenum, cadmium, scandium, titanium, vanadium, chromium, manganese, iron, cobalt, nickel, copper, yttrium, zirconium, niobium, technetium, ruthenium, rhodium, palladium, silver, hafnium, tantalum, tungsten, rhenium, osmium, iridium, platinum, gold, mercury, rutherfordium, dubnium, seaborgium, bohrium, hassium, meitnerium, darmstadtium, roentgenium and ununbium, post-transition metals such as aluminium, gallium, indium, tin, thallium, lead, bismuth, ununtrium, ununquadium, ununpentium and ununhexium, lanthanoids such as lanthanum, cerium, praseodymium, neodymium, promethium, samarium, europium, gadolinium, terbium, dysprosium, holmium, erbium, thulium, ytterbium and lutetium, and actinoids such as actinium, thorium, protactinium, uranium, neptunium, plutonium, americium, curium, berkelium, californium, einsteinium, fermium, mendelevium, nobelium and lawrencium. Alternatively, the silicon anode may also include lithium, sodium, magnesium, copper, nickel, zinc, aluminum, germanium, gallium, silver and manganese.

In order to facilitate the replenishment of the silicon fuel and improve its performance, the silicon can be in the form of a powder, thus the system can benefit from the intrinsic imperfections of small fragments of the silicon lattice and moreover, benefit from the increased surface area of a powder as compared to the monolithic anode of a single silicon wafer of comparable mass. In such embodiments, an anodic silicon powder is used, as opposed to the monolithic anode configuration presented hereinabove.

The anodic silicon powder, according to some embodiments of the invention, may be characterized by a particle size ranging from 0.1 micrometer to 1 millimeter, although finer or cruder powders are also possible in the context of the present embodiments.

According to some embodiments of the present invention, the anodic powder may be in a form of a powder formed from an alloy of silicon and other metals (a powder of the alloy), as presented in the case of the monolithic alloy anode, or can be a mixture of silicon powder and one or more powders of other metals.

The silicon-air battery presented herein further comprises a non-aqueous electrolyte. The term "electrolyte", as used herein, refers to a substance which can conduct electricity by charge displacement of charge carrier species. Electrolytes which consist of ions in solution are typically known as ionic solutions, and are typically aqueous solutions of inorganic substances. Other electrolytes include molten electrolytes, liquid electrolytes and semi-solid electrolytes which are substances wherein one component of their structure, the cationic or anionic, is essentially free for displacement throughout the structure, acting as charge carrier.

Traditionally, commercial batteries employ aqueous ionic solutions, and more specifically aqueous alkaline solutions as effective electrolytes.

The present inventor has now demonstrated that the batteries disclosed herein can be constructed and operate efficiently while using an electrolyte which is essentially a non-aqueous electrolyte.

The phrase "non-aqueous electrolyte", as used herein, refers to non-aqueous solvent based soft matter ionic conductors. These electrolytes are typically salts of an organic substance in a liquid, polymeric, gel, semi-solid or solid state, which are substantially devoid of water. Hence, non-aqueous electrolytes are able to serve as effective electrolytes without the presence of water. The physical state of a non-aqueous electrolyte, referred to herein as "soft", allows the cations, the anions or both to be highly mobile and displaceable and take the role of charge carriers.

According to some embodiments of the present invention, the choice of non-aqueous electrolytes ranges from molecular liquids to room temperature ionic liquids (RTIL) to semi-solid solvents such as polymers. The ionic conductivity is dependent on several parameters related to both solvent (e.g. dielectric constant, viscosity, chemical composition) and also to certain extent on the salt (concentration, chemical composition). Several measures can be taken to augment the room temperature ionic conductivity of non-aqueous solvent based ionic conductors, such as, for example, the dispersion of functional ceramic oxides in a non-aqueous matrix irrespective of the solvent being a liquid or a solid. Typically, ionic conductivity of such a composite electrolyte is optimized by tuning the ceramic oxide particle size (including aspect ratio), morphology and also by type and concentration of surface chemical groups.

Hence, according to some embodiments of the present invention, the non-aqueous electrolyte can be formed by a combination of a non-ionic polar solvent (such as, for example, alkylnitrile, e.g. ethylnitrile, propylnitrile and butylnitrile, and nitroalkyl solvents, e.g. nitromethane, nitroethane, nitropropane and nitrobutane) and charged species (such as, for example, tetraalkylammonium cations and $[F(FH)_n]^-$ onions wherein n=1-4), a charged polymer or various chain-lengths, imidazolium-based ionic liquids, benzoate-based ionic liquids, and any combinations thereof.

Exemplary polar organic liquids which are suitable to serve as solvents in non-aqueous electrolytes include, without limitation, linear ethers, cyclic ethers, esters, carbonates, lactones, nitriles, amides, sulfones, sulfolanes, diethylether, dimethoxyethane, tetrahydrofuran, dioxane, dioxolane, methyltetrahydrofuran, methyl formate, ethyl formate, methyl propionate, propylene carbonate, ethylene carbonate, dimethyl carbonate, diethyl carbonate, ethylmethyl carbonate, dibutyl carbonate, butyrolactones, acetonitrile, benzonitrile, nitromethane, nitrobenzene, dimethylformamide, N-methylpyrolidone, dimethylsulfone, tetramethylene sulfone, sulfolane and thiophene.

As used herein, the term "alkyl" describes an aliphatic hydrocarbon including straight chain and branched chain groups. Preferably, the alkyl group has 1 to 10 carbon atoms, and more preferably 1-40 carbon atoms. Whenever a numerical range; e.g., "1-10", is stated herein, it implies that the group, in this case the alkyl group, may contain 1 carbon atom, 2 carbon atoms, 3 carbon atoms, etc., up to and including 10 carbon atoms. The alkyl can be substituted or unsubstituted. When substituted, the substituent can be, for example, an alkyl, an alkenyl, an alkynyl, a cycloalkyl, an aryl, a heteroaryl, a halide, a hydroxyl and an alkoxy, as these terms are defined herein. When substituted with a halide, the alkyl is referred to as a haloalkyl. The term "alkyl", as used herein, also encompasses saturated or unsaturated hydrocarbon, hence this term further encompasses alkenyl and alkynyl.

The term "alkenyl" describes an unsaturated alkyl, as defined herein, having at least two carbon atoms and at least one carbon-carbon double bond. The alkenyl may be substituted or unsubstituted by one or more substituents, as described hereinabove.

The term "alkynyl", as defined herein, is an unsaturated alkyl having at least two carbon atoms and at least one carbon-carbon triple bond. The alkynyl may be substituted or unsubstituted by one or more substituents, as described hereinabove.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted by one or more substituents, as described hereinabove.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furane, thiophene, imidazole, oxazole, thiazole, pyrazole, pyridine, pyrimidine, quinoline, isoquinoline and purine. The heteroaryl group may be substituted or unsubstituted by one or more substituents, as described hereinabove. Representative examples are thiadiazole, pyridine, pyrrole, oxazole, indole, purine and the like.

As used herein, the term "halide" (also referred to herein as "halo"), describes an atom or an anion of fluorine, chlorine, bromine or iodine, also referred to herein as fluoride, chloride, bromide and iodide.

The term "hydroxyl", as used herein, refers to an —OH group.

As used herein, the term "amine" describes a —NR'R" group where each of R' and R" is independently hydrogen, alkyl, cycloalkyl, heteroalicyclic, aryl or heteroaryl, as these terms are defined herein.

The term "alkylammonium" refers to an amine cation having from 1 to 4 alky substituents, and the term "haloalkylammonium" refers to an amine cation having from 1 to 4 alky substituents wherein at least one thereof is a haloalkyl.

The term "tetraalkylammonium" describes an $N^+RR'R''R'''$ group where each of R, R', R" and R''' is independently an alkyl, haloalkyl, cycloalkyl and heteroalicyclic, as these terms are defined herein.

As used herein, the term "alkoxy" refers to a —OR group where each of R is alkyl, cycloalkyl or heteroalicyclic, as these terms are defined herein.

In some embodiments, exemplary non-aqueous electrolytes which are suitable for use in the context of embodiments of the invention, are such as described in U.S. Pat. Nos. 4,132,837, 4,652,968, 5,451,477, 5,427,874, 6,521,376 and 6,902,684 and U.S. Patent Application Nos. 20070099079 and 20090325065, all of which are incorporated by reference as if fully set forth herein. Exemplary hydrophobic ionic liquids, which are suitable for use in the context of embodiments of the invention are described in s U.S. Pat. Nos. 5,827,602, 5,683,832, 5,514,493, 5,273,840 and 5,220,106, all of which are incorporated by reference as if fully set forth herein.

In order to serve effectively as electrolytes in the context of a silicon-air battery, the non-aqueous electrolyte should be characterized by electric conductivity at room temperature of at least 0.1 mS to 1000 mS, and by being substantially non-reactive/corrosive with respect to the anode/cathode material. Benignity with respect to toxicity, environmental issues and low cost are also considered when selecting a suitable non-aqueous electrolyte for the silicon-air battery presented herein.

According to some embodiments of the present invention, the non-aqueous electrolyte which is suitable a silicon-air battery is a room temperature ionic liquid.

The phrase "room temperature ionic liquid" or RTIL, as used herein, refers to a salt, typically of an organic substance, that have a sufficiently low melting point such that allows it to be liquid at room temperature. In the context of the present embodiments, the term RTIL refers to salts that remain substantially liquid (do not solidify or boil) at a temperature range of –20-90° C.

Non-limiting examples of cations in RTIL include substituted or unsubstituted imidazolium cations, substituted or unsubstituted morpholinium cations, substituted or unsubstituted oxazolium cations, substituted or unsubstituted piperidinium cations, substituted or unsubstituted pyrazinium cations, substituted or unsubstituted pyrazolinium cations, substituted or unsubstituted pyrazolium cations, substituted or unsubstituted pyridazinium cations, substituted or unsubstituted pyridinium cations, substituted or unsubstituted pyrimidinium cations, substituted or unsubstituted pyrrolidinium cations, substituted or unsubstituted thiazolium cations, substituted or unsubstituted triazolium cations, substituted or unsubstituted 1,2,4-triazolinium cations, substituted or unsubstituted 1,2,3,4-tetrazolinium cations, 3-alkyl-1-methylimidazolium, 1-alkylpyridinium, N-methyl-N-alkylpyrrolidinium, 1-methyl-4-alkyl-1,2-triazolinium, 1-methyl-(2, 3 or 4)-alkyltetrazolinium, tetraalkylammonium, phosphonium, sulfonium, uronium and guanidinium. When substituted, the aforementioned cations may be substituted with haloalkyl groups, such as trifluoro-, difluoro- and fluoro-alkyls.

The aforementioned cations can be coupled with anions such as, for example, halides (such as $[F(FH)_n]^-$ onions wherein n=1-4), tetrafluoroborate, hexafluorophosphate, bis-triflimide, triflate, tosylate, formate, alkylsulfate, alkylphosphate and glycolate. Other suitable anions include, for example, perfluoro-1,1-dimethylpropyl alkoxides, mono- or di-perfluorosulfonate, $(CF_3)_2PF_4^-$, $(CF_3)_3PF_3^-$ $(CF_3)_4PF_2^-$, $(CF_3)_5PF^-$, $(CF_3)_6P^-$, $SF_5CF_2SO_3^-$, $SF_5CHFCF_2SO_3^-$, $(CF_3SO_2)_2CH^-$, $(SF_5)_3C^-$ and $(O(CF_3)_2C_2(CF_3)_2O)_2PO^-$. Alternatively, the anion is a non-Lewis acid-containing polyatomic anion having a Van der Waals volume exceeding 100 Å$^3$.

In order to withstand repeated cycles of charging and recharging, or in order to act as a continuous fuel cell, the silicon-air battery should exhibit minimized electrode corrosion and suffocation, which are typical to any thermodynamic close or open electrochemical cell systems. Corrosion and suffocation occur due to interaction of by-products of the reaction (such as $SiO_2$ and $SiF_4$) contaminants from the ambient surrounding (such as $CO_2$, $H_2O$ etc.), extreme environmental conditions (such as heat, pressure, flow etc.), and other processes that may "poison" the catalyst or otherwise reduce the efficiency of the electrodes. In order to minimize these adverse processes, the cell, and particularly the electrolyte and the electrodes, can be treated or supplemented with protective means.

The electrochemical formation of gaseous $SiF_4$ as a product of the anodic reaction between fluoride ions in the electrolyte and silicon, silicon dioxide and other silicate species has been known in the art. In the context of the present embodiments, this reaction may corrode the silicon anode, causing its depletion and may further cause current irregularities in the silicon-air battery. Hydrofluoric acid is known as capable of dissolving metal oxides. For example, it can remove oxide impurities from silicon wafers, and similarly, it is used to etch and clean glass. Hydrofluoric reacts with silicon dioxide ($SiO_2$, silica) to form gaseous or water soluble silicon fluorides, following the equations:

$$SiO_2 + 4HF \rightarrow SiF_4 (g/aq) + 2H_2O \qquad (5)$$

$$SiO_2 + 6HF \rightarrow H_2SiF_6 + 2H_2O \qquad (6)$$

Hence, the addition of hydrofluoric acid $[F(FH)_n]H$ (wherein n=1-4) or other forms of fluoride such as ammonium fluorides, may assist in reversing the adverse effects of the formation of gaseous $SiF_4$, as can be seen in the following electrochemical equations:

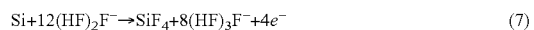

$$Si + 12(HF)_2F^- \rightarrow SiF_4 + 8(HF)_3F^- + 4e^- \qquad (7)$$

$$O_2 + 12(HF)_3F^- + 4e^- \rightarrow 2H_2O + 16(HF)_2F^- \qquad (8)$$

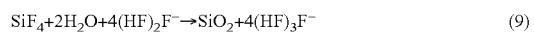

$$SiF_4 + 2H_2O + 4(HF)_2F^- \rightarrow SiO_2 + 4(HF)_3F^- \qquad (9)$$

which overall summing to the silicon-air reaction:

$$Si + O_2 \rightarrow SiO_2 \qquad (4)$$

Hence, according to some embodiments of the invention, the electrolyte further includes a fluoride. In some embodiments, the fluoride is at a concentration ranging from 0.001 to 50 percent by weight of the electrolyte or from 0.1 to 10 percent by weight of the electrolyte. Fluoride anions can be added to the electrolyte in the form of, for example, HF, $NH_4F$ and KF.

While reducing the invention to practice, it was found that the addition of water to the non-aqueous electrolyte improves the performance of the silicon-air battery. Without being bound by any particular theory, it is assumed that since water is formed and consumed in the process of turning silicon to silicon dioxide (see, Equations 8 and 9 respectively), and since the intermediate compound $SiF_4$ is forced to migrate near the cathode (due to the presence of a low pressure vent and positive charge attraction), the addition of some water to the non-aqueous electrolyte pushes the silicon oxidation reaction to completion in a more efficient manner.

Hence, according to some embodiments of the present invention, water is added to the non-aqueous electrolyte in an amount that ranges from 0.001 to 95 percent b weight of the electrolyte.

As silicon dioxide is formed at the cathode as a by-product of the electrochemical reaction of the silicon-air battery presented herein, cathode suffocation can result from $SiO_2$ accumulation thereon. The present inventor has shown that addition of silicon hydroxide species to the non-aqueous electrolyte may reduce this detrimental effect.

Silicon hydroxide, or silicic acid, is a general name for a family of chemical compounds of the element silicon, hydrogen, and oxygen, with the general formula $[SiO_x(OH)_{4-2x}]_n$. Some simple silicic acids have been identified in very dilute aqueous solution, such as metasilicic acid ($H_2SiO_3$), orthosilicic acid ($H_4SiO_4$, $pK_{a1}=9.84$, $pK_{a2}=13.2$ at 25° C.), disilicic acid ($H_2Si_2O_5$), and pyrosilicic acid ($H_6Si_2O_7$), however in the solid state these probably condense to form polymeric silicic acids of complex structure.

According to some embodiments of the invention, the non-aqueous electrolyte includes silicic acid.

In some embodiments, the aqueous alkaline solution includes silicic acid at a concentration ranging from 0.001 to 70 percents by weight of the electrolyte.

In some embodiments, in order to enable ambient oxygen to participate in the electrochemical reaction and oxidize silicon, the air cathode includes a layer of a catalyst for trapping oxygen. Exemplary such catalysts include, but are not limited to, palladium, platinum, nickel, cobalt, iron, manganese, ceramic oxides, metal oxides carbon, and any combination thereof.

The air cathode which can serve as a positive electrode for reduction of oxygen, can be any air cathode suitable for a metal-air battery. Teaching of air cathodes can be found, for example, in U.S. Pat. Nos. 3,912,538, 4,407,907, 4,562,124, 4,894,296, 4,927,718, 5,306,579, 5,308,711, 5,342,704, 5,432,022, 5,453,330, 5,665,481, 5,733,676, 6,127,061, 7,588,856 and 7,588,856, all of which are incorporated by reference as if fully set forth herein.

Typically, the air cathode is made of a conductive material and configured to have a large surface area in order to increase its contact with ambient air. In addition, in some embodiments, the air cathode is coated, at least partially, with a layer of a catalyst. As used herein, the term "catalyst" refers to a substance which is capable of accelerating and promoting the dissociation of molecular oxygen.

In some embodiments, an additional layer of highly porous material is also applied over the catalyst layer. Such an additional layer can further facilitate and promote oxygen dissociation at the cathode. The porous layer may comprise a carbonaceous substance or a carbon-less mineral or polymeric substance, such as a fluorinated ethylene propylene polymer and the likes.

In some embodiments, the highly porous layer of the catalytic portion of the air cathode is made up of a mixture of carbon particles, such as carbon fibers or graphite, a particulate material having a high surface area, such as activated carbon, molecular sieves, zeolite, or any other material having a high surface area, metal hydroxide and hydrophobic particles. Graphite, carbon black or carbon fibers act as conductive filler in the catalytic portion or layer for providing a bridge or pathway to allow electrons to transfer from the metal mesh of the cathode through the non-conductive particulate matter having a high surface area. As in the case of lithium-air batteries, non-soluble reaction products are deposited at the porous air electrode. Therefore the level of carbon's porosity in the air electrode and the size of the exposed interface surface area have a significant influence on the cell capacity.

The high surface area particulate matter, such as the activated carbon, zeolite, molecular sieves, and the like may provide a significant interface contact area for the catalytic reactions. Substantially any metal hydroxide is effective at increasing the electrochemical reaction and consequently the efficiency of an electrochemical cell or battery. Metal hydroxides particularly effective include nickel hydroxide, cobalt hydroxide, iron hydroxide, manganese hydroxide, lanthanum hydroxide, chromium hydroxide and cerium hydroxide. Hence, metal hydroxides are also contemplated in some embodiments of the invention.

The mixture making up the catalytic portion or layer of the air cathode may also include hydrophobic particles, such as polytetrafluoroethylene (PTFE) and other hydrophobic particles mentioned heretofore. These hydrophobic particles may help inhibiting the infusion of water under hydrostatic pressure and capillary attraction to help maintaining the appropriate environment for the electrochemical reactions to take place.

In some embodiments, an adhesive such as epoxy is added. Such an adhesive may help binding the particles of the catalytic portion of the air cathode together.

In addition to the structural and chemical configuration, surface-area, coating and the presence of a catalyst, the air cathode may also comprise a mechanical appendix that can circulate, blow, force or otherwise increase the flow of air or pure oxygen therethrough. Hence, according to some embodiments of the present invention, air, an oxygen-rich gaseous mixture or pure oxygen is being delivered mechanically into the cathode of the battery by a mechanical, electrical or any other air-flow increasing device, such as for example, a pump, a fan, a ventilator a high-pressure container and a tube, which can form a part of the air cathode compartment or be external to the cathode.

The silicon-air batteries according to some embodiments of the present invention may be useful in a form of miniature primary fuel cell for applications such as, for example, microelectromechanical systems (MEMS) and implantable autonomous medical devices which are hard to access, or large multi-cell batteries with replaceable anodes.

Other types of silicon-air batteries for intermediate and small size applications may include those which are manufactured in the form of miniature button cells for hearing aids and alike. The typical silicon-air button cell would generally includes a cathode having at least one air port for the entrance of air and which contains a non-consumable air cathode structure usually comprising a gas permeable hydrophobic polymer film onto which is bonded a metal current collection grid and a waterproofed porous catalyst material, such as metal catalyzed active carbon mixed with a hydrophobic binder. The button cell would also includes an anode container or can which is joined to the cathode typically by crimping and which includes a silicon anode mass, typically in the form of amalgamated silicon powder, or a porous silicon which is compacted and saturated with an electrolyte. The battery would also include an insulator between the cathode and anode, typically made of polyethylene, polypropylene, nylon, and the like, which can function as an electrolyte seal.

Figure 2:
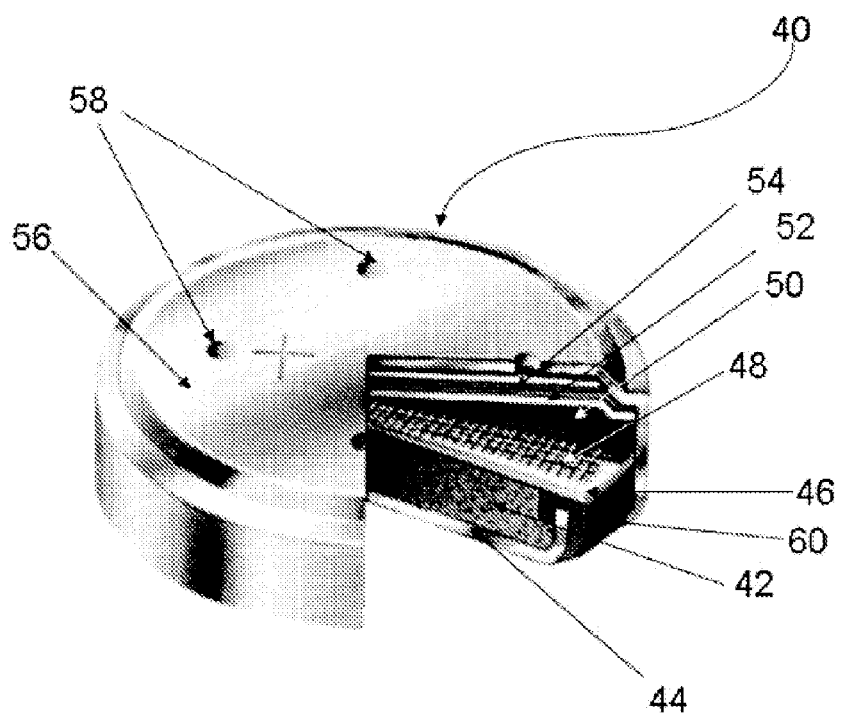
FIG. 2 presents an illustration of an exemplary button-shaped silicon-air battery 40 according to some embodiments of the present invention, wherein silicon powder forming the anode and the RTIL electrolyte mixture 42 is contained in anode can 44 and separated by mechanical separator 46 from the air cathode comprising nickel plated screen 48 coated with pressed carbon layer 50, which is covered with oxygen permeable hydrophobic membrane 52 (made of PTFE for example) and topped with air diffusion and storage layer 54 (made of paper for example) which is covered with cathode can 56 having air access holes 58 which is insulated from anode can 44 by insulating gasket 60.

FIG. 2 is an illustration of an exemplary button-shaped silicon-air battery 40 according to some embodiments of the present invention, wherein silicon powder forming the anode and the RTIL electrolyte mixture 42 is contained in anode can 44 and separated by mechanical separator 46 from the air cathode comprising nickel plated screen 48 coated with pressed carbon layer 50, which is covered with oxygen permeable hydrophobic membrane 52 (made of PTFE for example) and topped with air diffusion and storage layer 54 (made of paper for example) which is covered with cathode can 56 having air access holes 58 which is insulated from anode can 44 by insulating gasket 60.

The silicon-air batteries according to some embodiments of the present invention may be used as a power source for electric vehicles and the like, because they provide high energy density relative to other cell chemistries. Silicon-air batteries may also be suitable because they may be recharged by mechanically replacing the anode, by replacing the liquid electrolyte which contains silicon particles or by electromechanically replenishing silicon to the anode while also making available a fresh oxygen supply.

Any of the batteries described herein can thus be used in many applications. Generally, the silicon-air battery according to embodiments of the present invention can be incorporated in any electrically driven or hybrid electric (namely, driven by electrical and at least one additional form of energy) system or device, or can be in electrical communication with the system or device for operating it. Systems and devices incorporating the silicon-air battery as described herein can be stationary or movable, portable or non-portable. In some embodiments, the silicon-air battery is incorporated in a power source which is adapted to power an electrically driven system or device, as described herein. The size, shape and output of the silicon-air battery are preferably adapted to the application which consumes its energy.

Herein, the phrase "electrically driven system or device" and "electricity consuming system or device" are used interchangeably.

One type of application which can incorporate the silicon-air battery or portable power source according to some embodiments of the present invention is an electronic device. Representative examples of such device, include, without limitation, a portable telephone, a personal computer, a notebook computer, a portable charging dock, a pager, a PDA, a digital camera, a gameplayer, a smoke detector, a hearing aid, a portable TV, night vision goggles, a portable GPS device, a portable lighting device, a toy, a computer peripheral device, an household appliance, a cordless household appliance, an industrial product, a mobile equipment, a robot, a cordless tool (e.g., drill, saw).

Another type of application which can incorporate the silicon-air battery or portable power source according to some embodiments of the present invention is an electrically driven or hybrid electric vehicle. One example of a vehicle suitable for the present embodiments is an automobile such as, but not limited to, a car, a bus, a forklift, a segway, a motorcycle, a mobility scooter, a two- three- or four-wheel scooter, a saddle-ride type vehicle. Another example is an unmanned utility vehicle, such as, but not limited to, an autonomous lawn mower, an autonomous pool cleaner and the like. An additional example is an elevated altitude manned or unmanned vehicle, such as, but not limited to, an aircraft, a high altitude aircraft, a rocket and a spacecraft. A further example is a manned or unmanned underwater or above-water vehicle.

The silicon-air battery described herein can also be incorporated in distributed power source such as, but not limited to, a cogeneration system or a stationary power plant for a house, a public structure an industrial facility. Also contemplated are various appliances typical used in emergency situations, including, without limitation, emergency kits, emergency power supplies, emergency lights, backup generators and the like.

The silicon-air battery presented herein can be further used as a component in an autonomous power source in a location, such as, but not limited to, spacecraft, weather station, park, rural location and the like. A silicon-air battery according to some embodiments of the present invention can be compact and lightweight.

The silicon-air battery presented herein can be further used in combined heat and power systems. The silicon-air battery of the present embodiments can be used to generate electric power, and at the same time produce and utilize the by-product "waste" heat.

In some embodiments, the silicon-air battery described herein is utilized in a method for powering an electrically-driven or electricity-consuming system or device, as described herein. The powering is effected by establishing electrical communication (e.g., connecting) between the silicon-air battery and the electricity-consuming system or device.

It is expected that during the life of a patent maturing from this application many relevant silicon-air batteries will be developed and the scope of the phrase "silicon-air battery" is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

As used herein the term "about" refers to ±10%.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Various embodiments and aspects of the present invention as delineated hereinabove and as claimed in the claims section below find experimental support in the following examples.

EXAMPLES

Reference is now made to the following examples, which together with the above descriptions, illustrate some embodiments of the invention in a non limiting fashion.

Silicon is an attractive fuel for batteries and fuel cells, and particularly silicon-air batteries. The silicon-oxygen electrochemistry has a specific energy of 8470 Wh/kg and an energy density of 21,090 Wh/l. From thermodynamic aspects, silicon is outperformed by only the $H_2/O_2$ systems, and is comparable to $Al/O_2$ systems, the latter having a specific energy of 8146 Wh/kg and an energy density of 21,994 Wh/l. Furthermore, silicon is abundant, being the eighth most plentiful element in the universe and the second most plentiful in the earth's crust. Silicon and silicon dioxide are also non-toxic. Further-still, the electrochemical reaction of silicon produces silicon dioxide ($SiO_2$, silica) which can be reduced back readily, can be disposed of safely (as pure sand) or can be recycled for use in a multitude of applications (e.g., building materials, glass industry and the likes).

The following experiments were aim at investigating the electrochemical behavior of non-aqueous ionic liquids and other additives on the performance of silicon-air electrochemical fuel-cell system, which can serve as high density energy source.

The experiments are based on the theory that asserts that new metal air battery based on silicon anode would yield 1 electron per 8 equivalent grams of material (4 moles of electrons per 32 grams of Si), which is 400% higher capacity that conventional Zn-air batteries.

Materials and Experimental Methods

Materials:

The exemplary prototypic fuel cell employed for the experiments presented below is illustrated in FIG. 1.

Silicon-air cells having a diameter of 0.8 cm and a surface area of 0.5 cm2, comprising of a heavily doped n++-type silicon wafer anode and an air cathode were discharged different current loads with a battery cycler (Maccor 2000).

Air electrodes were cut into circular sheets, with 0.5 cm$^2$ exposed area, and outer circle periphery for electrical contact, and a PTFE microporous layer was attached to the air side of the electrode.

Terminal contacts were made with Cu wires.

Silicon single-crystal wafer electrodes including [100] As(arsenic)-doped (0.001-0.005 Ω·cm), [111] As-doped (0.001-0.007 Ω·cm), [111] Sb(antimony)-doped (<0.02 Ω·cm) and [100] medium As-doped (0.1-0.6 Ω·cm) were supplied by University Wafer, USA, and heavily doped p-type wafers, including [100] (0.001-0.005 Ω·cm), (0.005-0.01 Ω·cm) and medium doped [100] (1-3 Ω·cm) were supplied by Si-Mat GmbH, Germany, and were supported with a screwed back contact plate made of gold plated stainless steel.

Silicon wafers were cut to 1 cm×1 cm pieces and were pressed into a viton O-ring, achieving 0.5 cm$^2$ exposed surface area. Prior to any experiment the silicon sample was immersed in the HF solution (1HF:5$H_2O$) for ten seconds in order to remove surface oxide layer. The silicon anode was then rinsed with de-ionized (DI) water and dried using a nitrogen stream. RTIL (0.5 ml) was added on top of the dried anode after the cell was assembled.

The air electrode comprised a PTFE powder and activated carbon black (0.45-0.5 gram/cm2 loaded) structure catalyzed by manganese dioxide, supplied by Electric Fuel Inc., pressed onto a nickel 200 mesh (200 openings per inch of a fine nickel screen).

Room temperature ionic liquid (RTIL) 1-ethyl-3-methylimidazolium:$(HF)_{2.3}F$ or EMI.(HF)2.3F served as the electrolyte and was provided by R. Hagiwara from Kyoto University, Japan.

Methods:

All experiments were conducted under ambient conditions.

Silicon cyclic voltammetry, potentiodynamic and linear polarization studies (performed with EG&G Princeton Applied Research potentiostat/galvanostat 2273) were conducted in an electrochemical cell comprised of Pt quasi-reference and Pt counter electrode, while silicon wafer anode or air cathode served as the working electrode.

Example 1

Half-Cell Analysis of Silicon-Air Battery

The sensitivity of silicon to KOH is a well known fact which is employed in the silicon industry to etch silicon. Silicon etching rate is measured to be in the order of tens of μm per minute and therefore, high rates of self discharge processes are expected from silicon-air batteries using KOH as the electrolyte. However, silicon-air batteries using the intuitive electrolyte KOH showed rapidly decreasing output due to extreme fast corrosion process of silicon in alkaline solutions.

To overcome the problems associated with aqueous alkaline electrolytes, non-aqueous room temperature ionic liquids RTIL were used as electrolytes in the following examples. Specifically, EMI.(HF)2.3F, an exemplary RTIL, was chosen as an alternative electrolyte due to its special features and due to the anodic features.

RTILs based on 1-Ethyl-3-methyl-imidazolium (EMI) cation exhibit low viscosity and high conductivity. The synthesis of EMI.(HF)2.3F RTIL by a reaction with hydrogen fluoride was reported by Hagiwara, R. et al. in *J. Electrochem. Soc.* 149, 2002, D1.

Specifically, EMI.$(HF)_{2.3}$F consists of an EMI cation and the anion consists of 30% of the $H_3F_4^-$ or $(HF)_{3F}^-$ species and 70% of the $H_2F_4^-$ or $(HF)_2F^-$ species, as illustrated in Scheme 1 below. It is noted herein that the denotation 2.3 does not mean to be a non-integer but rather denote a mixture of the $(HF)_2F^-$ and the $(HF)_3F^-$ species, hence EMI.$(HF)_{2.3}$F can also be denoted EMI:$(HF)_2F$:$(HF)_3F$.

Scheme 1

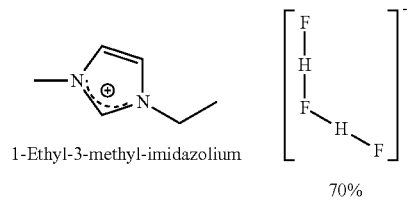

-continued

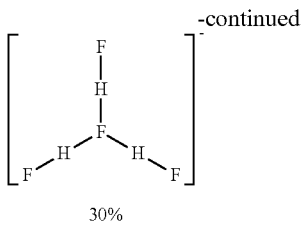

30%

This particular RTIL was selected for these experiments since it possesses a high conductivity (100 mS/cm, the highest among RTIL's of its kind), low viscosity and chemical stability in air. Furthermore, the formation of macro-porous over the silicon surface was reported for the anodic dissolution reaction of EMI.(HF)2.3F RTIL with n-type silicon [Raz, O., et al., Electrochem. Solid-State Lett., 10 (2007) D25; Schutz, R. W. et al., Corrosion: Materials Vol. 13B, in: ASM Handbook, ASM International, Material Park, 2005; and Zhang, S. S., et al., Power Sources 195 (2010) 1235].

Table 1 presents silicon corrosion currents and corrosion rates recorded for different wafers types, utilizing EMI.(HF)2.3F RTIL electrolyte. The corrosion rates were calculated using the corrosion currents, obtained with the use of linear polarization experiments in the range of ±20 mV relative to OCP. The result shows high stability and negligible corrosion rates for silicon in EMI.(HF)2.3F.

TABLE 1

| Corrosion rate (nm/min) | Corrosion current (µA/cm$^2$) | Silicon type |
| --- | --- | --- |
| 0.16 | 8.71 | n [100] (As) |
| 0.08 | 4.23 | n$^{++}$ [100] (As) |
| 0.08 | 4.22 | n$^{++}$ [111] (As) |
| 0.07 | 3.71 | n$^{++}$ [111] (Sb) |
| 0.02 | 1.29 | p [100] |
| 0.01 | 0.54 | p$^{++}$ [100] |
| <0.01 | 0.42 | p$^{++}$ [111] |

It should be stated that silicon corrosion rates resemble corrosion rates of highly resistive metals in extreme environments, such as titanium in strong reducing agents.

In order to determine whether the coupling between the EMI.(HF)2.3F RTIL electrolyte, silicon anode and oxygen cathode can lead to reasonable battery performances, potentiodynamic experiments were conducted. Cathodic polarization of the air electrode and anodic polarizations profiles of several silicon wafers are shown in FIG. 3.

Figure 3:
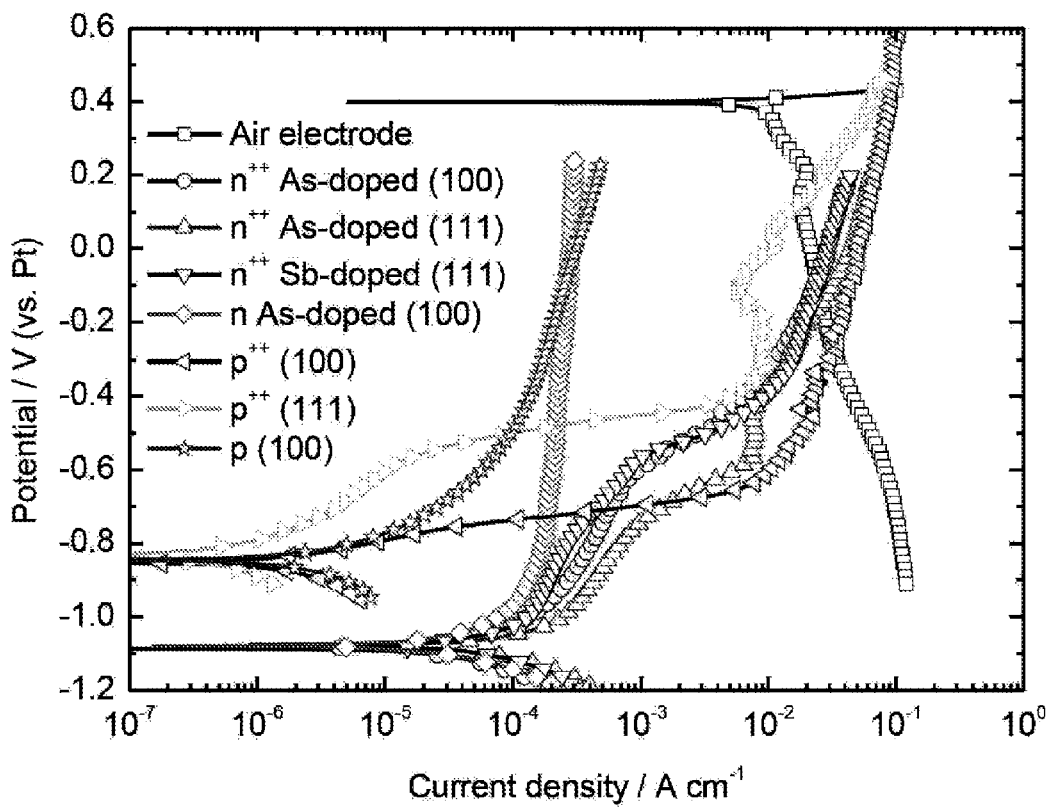
FIG. 3 presents comparative plots of polarization voltammograms recorded for with $EMI.(HF)_{2.3}F$ RTIL at 5 mV per second between the two half cells and comparing various electrodes wherein the potentials difference at open circuit potential (OCP) conditions between the two half cells is 1.25-1.5 V.

FIG. 3 presents comparative plots of polarization voltammograms recorded for with EMI.(HF)$_{2.3}$F RTIL at 5 mV per second between the two half cells and comparing various electrodes wherein the potentials difference at open circuit potential (OCP) conditions between the two half cells is 1.25-1.5 V.

The reduction of oxygen is postulated to occur in the non-aqueous RTIL media either as 4-electrons $O_2+4e^-\rightarrow 2O_2^{2-}$ and/or 2-electrons reaction, $O_2+2e\rightarrow O_2^{2-}$.

As can be seen in FIG. 3, there is no major difference in the anodic behavior of the various heavily doped n-type silicon electrodes, namely no effect of dopant type and crystal orientation. All heavily doped n-silicon electrodes showed no anodic passivity up to 1.3 V (versus platinum) during the anodic polarization. On the other hand, the medium doped n-type curve (having the diamonds symbol in FIG. 3) does exhibit a passivation region along the whole anodic potential range. OCP values for the p-type silicon are 0.25-0.3 V more positive (anodic) than the corresponding n-type. This is in agreement with overall more negative OCP value for n-type than for p-type silicon.

The results shown in FIG. 3 and Table 1 reveal that more than one type of silicon anode can serve in the silicon-air battery using RTIL. As can be seen in FIG. 3, there is a potential difference between the anode and the cathode of about 1.25-1.5 V, while conducting the polarizations close to the OCP, compared with a theoretically standard cell potential of 2.16 V. All heavily doped silicon wafers evaluated did not show passivation behavior in the relevant potential range. The only silicon anode that exhibited passivity is the n-medium-doped [100] silicon anode having the diamonds symbol in FIG. 3).

In the low current density region (less than 1 mA per cm$^2$), n++ silicon exhibits a wider potential window than the p++ silicon, with regard to the air electrode potential. However, once higher current densities are being considered of above 1 mA per cm$^2$, the resulting potential difference for p++ silicon is the higher one, namely 1.05 V compared to 0.9 V for n++ silicon. Considering the self corrosion rates, the choice of one type of anode versus another should consider that p++ silicon exhibits lower corrosion rates than n++, hence longer shelf life.

In summary, it appears that n-type silicon anodes would yield a higher cell voltage, while p-type silicon anodes would provide lower corrosion current values hence a longer shelf life, whereas each characteristic is advantageous for specific applications.

Example 2

Galvanostatic Discharge Behavior

Figure 4:
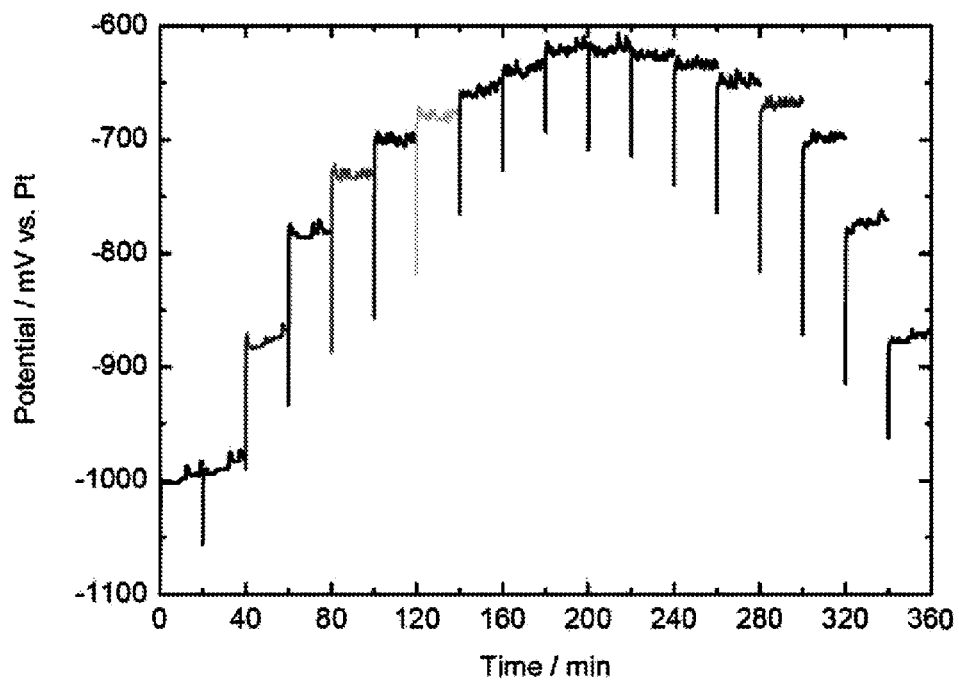
FIG. 4 presents the galvanostatic polarization curve as measured for an exemplary silicon-air battery according to some embodiments of the present invention, using a silicon [100] of anode heavily As-doped n-type ($n^{++}$) and $EMI.(HF)2.3F$ electrolyte (corresponding to the curve having the circle symbol in FIG. 3), and current density from 100 µA per $cm^{-2}$ to 1000 µA per $cm^{-2}$ and back to 100 µA per $cm^{-2}$, in 100 µA per $cm^{-2}$ intervals, each for 20 minutes.

The galvanostatic discharge behavior of a silicon-air battery was studied by polarization of the working electrode against a Pt counter electrode at different current densities, resulting in up and down staircase curves, as presented in FIG. 4.

FIG. 4 presents the galvanostatic polarization curve as measured for an exemplary silicon-air battery according to the present invention, using a silicon [100] of anode heavily As-doped n-type (n$^{++}$) and EMI.(HF)2.3F electrolyte (corresponding to the curve having the circle symbol in FIG. 3), and current density from 100 µA per cm$^{-2}$ to 1000 µA per cm$^{-2}$ and back to 100 µA per cm$^{-2}$, in 100 µA per cm$^{-2}$ intervals, each for 20 minutes.

As can be seen in FIG. 4, the obtained half-cell potential value is more positive as the current density increases. However, frequent fluctuations are observed in each step of the 20 minutes constant current polarization. The frequency of these fluctuations depends on the current density; as the current density increases the fluctuations detected in the specific measured potential appear in higher frequency. The fluctuations are attributed to the electrochemical formation of gaseous SiF$_4$, [Tsuda, T., et al., Electrochim. Acta, 53 (2008), pp. 3650] as a product of the anodic reaction between EMI.(HF)$_{23}$F RTIL and n-type silicon. Each alteration in the potential-time profiles during a specific constant current step indicates a build-up and release of SiF$_4$ at the silicon surface.

Thus, the anodic electrochemical dissolution of highly doped silicon EMI.(HF)$_{23}$F RTIL is preformed according to the following suggested reaction scheme presented in Equation 7. Hence, anodic dissolution of silicon involves the formation of SiF$_4$, while 12 dihydrogen-fluoride anions of the ionic liquid transformed to 8 tri-hydrogenetated-fluoride anions, also constitute the ionic liquid. It should be noticed that pristine ionic liquid is composed of a mixture of di- and tri-hydrogenated fluoride anions in a ratio of 2:1.

Figure 5:
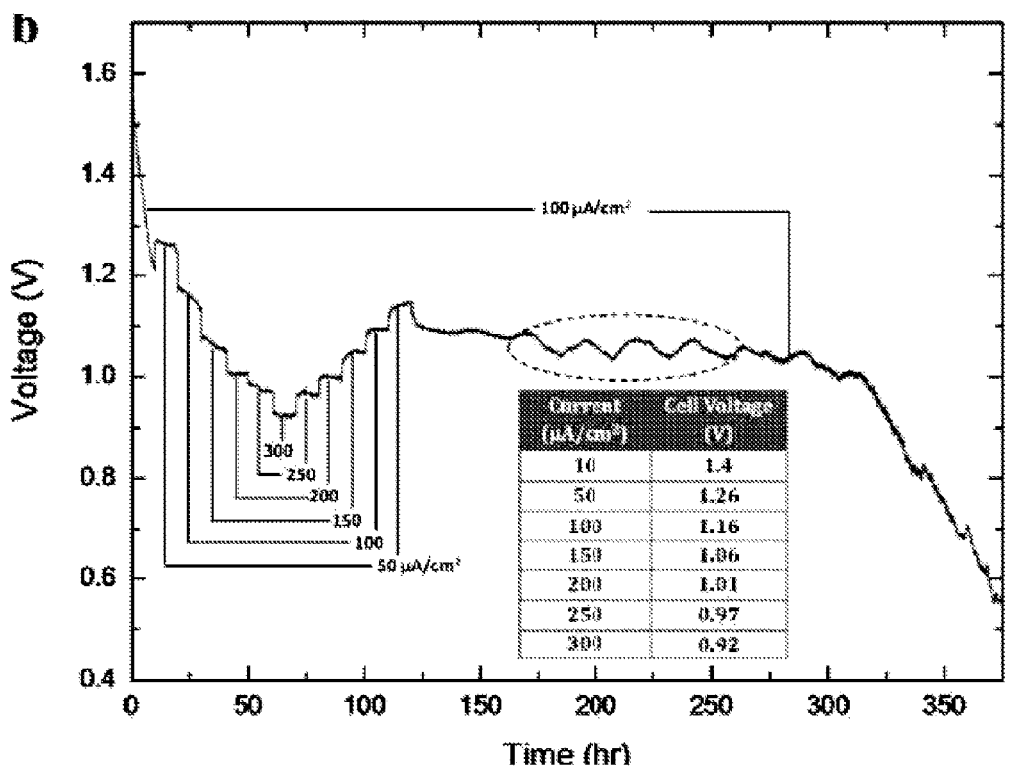
FIG. 5 presents a discharge plot at different current regimes as measured for an exemplary silicon-air battery according to some embodiments of the present invention, using EMI: 2.3HF-F RTIL as an electrolyte and heavily doped $n^{++}$ [100] silicon wafer as anode material, wherein the inset table presents working potential values recorded from battery discharged at different current densities.

Another typical discharge plot for a silicon-air battery measured under constant current mode of operation (galvanostatic polarization) is shown in FIG. 5. These data were collected from full cells utilizing a commercial air electrode, as the counter (cathode) electrode and heavily doped $n^{++}$-silicon as the fuel (anode), while the output voltage presented corresponds to a single cell potential. silicon-air fuel cell batteries, having an open circuit potential of 1.45-1.55 V, were discharged initially (first 10 hours) at a current density of 100 μA per $cm^{-2}$; then the discharge was conducted via 10 hours excursions in current densities ranging from 50 to 300 μA per $cm^{-2}$ and then stepped-back to 50 μA per $cm^{-2}$. Completion of these steps was achieved within a discharge time of 120 hours, harvesting a capacity of 9.5 mAh. The remaining discharge process (for an additional of 230 hours) was performed in a constant current mode; a current density of 100 μA per $cm^{-2}$ was applied until a cut-off potential of 0.7 V was achieved.

Hence, FIG. 5 presents a discharge plot at different current regimes as measured for an exemplary silicon-air battery according to some embodiments of the present invention, using EMI:2.3HF-F RTIL as an electrolyte and heavily doped $n^{++}$ [100] silicon wafer as anode material, wherein the inset table presents working potential values recorded from battery discharged at different current densities.

As can be seen in FIG. 5, stable and long lasting silicon-air fuel cell battery discharge potential profile (with potential plateau values of 1.25-0.9 V) was recorded as a function of current densities. The general trend for the cells voltage is to decrease with time. Such behavior can be attributed to the build-up of reaction products in the electrolyte and most likely to a progressive deactivation of the air cathode. This is well demonstrated in the observed working voltage oscillations, shown in the discharge profile over 20 hours intervals, marked with a dashed oval in FIG. 5.

Example 3

Silicon-Air Battery Discharge Performance

Silicon-air battery discharge performances under several current densities in ambient temperature were carried out in a cell configuration following the exemplary battery presented in FIG. 1. Data were collected using $n^{++}$ As-doped silicon anode (see also the curve denoted with circle symbols in FIG. 3). Prior to any discharge, the cell was held at OCP for 4 hours, allowing the electrolyte to properly wet the porous carbon constitutes the air electrode. Discharge was terminated in a cut off voltage of 0.5 V.

Figure 6:
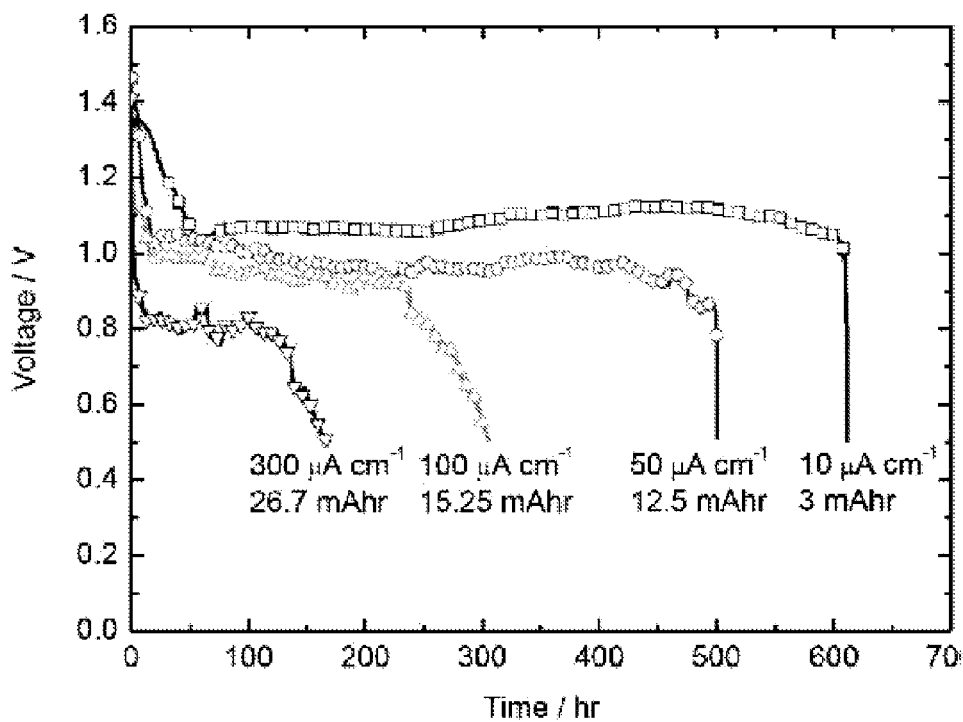
FIG. 6 presents comparative discharge plots of an exemplary silicon-air battery according to some embodiments of the present invention, using $EMI.(HF)_{2.3}F$ RTIL electrolyte at different constant current densities.

FIG. 6 presents comparative discharge plots of an exemplary silicon-air batteries according to some embodiments of the present invention, using EMI.$(HF)_{2.3}$F RTIL electrolyte at different constant current densities.

As can be seen in FIG. 6, the capacity values obtained for the silicon-air battery discharges are 3, 12.5, 15.25 and 26.7 mA per hour at current densities of 10, 50, 100 and 300 μA per $cm^2$, respectively. As can further be seen in FIG. 6, the cell voltage readings decrease with increasing current density due to polarization losses. The discharge potential is quite stable and relatively extended, with potential plateaus of 0.8-1.1 V, depending on the current density loads. It could be expected that the discharge time (and hence the capacity) obtained at a current density of 10 μA per $cm^2$ would as high as 10 times than the time (capacity) recorded for silicon-air battery discharged at a current density of 100 μA per $cm^2$. However, the results presented here show that this is not the case. It can be deduced from the above numbers that there is no correlation between the discharge current and discharge time (capacity), namely the discharge process is not controlled by the anodic silicon dissolution only. It is interesting to note that the battery is more efficient once it is being discharged at high rates (200 and 300 μA per $cm^2$), compared with low battery efficient at the slower rates (10 and 50 μA per $cm^2$). A suggested explanation for this unique behavior will be given below.

In-course of $SiF_4$ formation at the silicon-electrolyte interface, as presented hereinabove, a complete description of the cell discharge reaction at the cathode side may be provided by the following reactions:

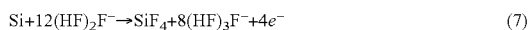

$$Si+12(HF)_2F^- \rightarrow SiF_4+8(HF)_3F^-+4e^- \quad (7)$$

$$O_2+12(HF)_3F^-+4e^- \rightarrow 2H_2O+16(HF)_2F^- \quad (8)$$

$$SiF_4+2H_2O+4(HF)_2F^- \rightarrow SiO_2+4(HF)_3F^- \quad (9)$$

Since the anion is the main charge carrier in the most RTILs such as $EMI(HF)_{2.3}F$, no cation is written in the above reactions. Oxygen is being reduced in the presence of 12 tri-hydrogenated fluoride anions to produce water and 16 di-hydrogenated fluoride anions and 2 water molecules, which further reacts with the $SiF_4$ produces during the anodic reaction to yield silicon-dioxide and 4 tri-hydrogenated fluoride anions.

The overall expected cell reaction, based on the two half cell reactions discussed above, is therefore:

$$Si+O_2 \rightarrow SiO_2 \quad (4)$$

which is the main power generating reaction is a silicon-air battery.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A battery comprising an anode, a cathode, a non-aqueous electrolyte and an electric conduit to allow electric current flow between said cathode and said anode, said anode comprising silicon as fuel, and said cathode comprising oxygen as an oxidant, wherein:
   said non-aqueous electrolyte is selected from the group consisting of an ionic liquid, a mixture of non-ionic polar solvent and a cation and an anion, a conductive polymer, and a ceramic oxide, and any combination thereof, and
   said non-aqueous electrolyte comprises an anion which has the general formula $[F(FH)_n]^-$, whereas n is an integer ranging from 1 to 4.

2. The battery of claim 1, wherein said oxygen is derived from ambient air.

3. The battery of claim 1, wherein said silicon is amorphous silicon.

4. The battery of claim 1, wherein said silicon is in a form of a single crystal wafer.

5. The battery of claim 1, wherein said silicon comprises a dopant.

6. The battery of claim 5, wherein said silicon is doped degenerately.

7. The battery of claim 1, wherein said silicon is in a form of a powder.

8. The battery of claim 7, wherein said powder is of an alloy which comprises said silicon and at least one metal in an amount that ranges from 1 to 99 percents by weight of the anode.

9. The battery of claim 7, wherein said powder further comprises a powder of at least one metal in an amount that ranges from 1 percent to 99 percents by weight of the anode.

10. The battery of claim 1, wherein said silicon is in a form of an alloy which comprises at least one metal, and wherein an amount of said at least one metal ranges from 1 to 99 percents by weight.

11. The battery of claim 1, wherein said non-ionic polar solvent is selected from the group consisting of an alkylnitrile solvent, a nitroalkane solvent, diethylether, dimethoxyethane, tetrahydrofuran, dioxane, dioxolane, methyltetrahydrofuran, methyl formate, ethyl formate, methyl propionate, propylene carbonate, ethylene carbonate, dimethyl carbonate, diethyl carbonate, ethylmethyl carbonate, dibutyl carbonate, butyrolactones, acetonitrile, benzonitrile, nitromethane, nitrobenzene, dimethylformamide, N-methylpyrolidone, dimethylsulfone, tetramethylene sulfone, sulfolane and thiophene.

12. The battery of claim 1, wherein said non-aqueous electrolyte comprises a cation selected from the group consisting of an alkylammonium and a haloalkylammonium.

13. The battery of claim 1, wherein when said non-aqueous electrolyte comprises an ionic liquid, a cation in said ionic liquid is selected from the group consisting of an alkali metal cation, an alkaline earth metal cation, a substituted or unsubstituted imidazolium, a substituted or unsubstituted morpholinium, a substituted or unsubstituted oxazolium, a substituted or unsubstituted piperidinium, a substituted or unsubstituted pyrazinium, a substituted or unsubstituted pyrazolium, a substituted or unsubstituted pyrazolium, a substituted or unsubstituted pyridazinium, a substituted or unsubstituted pyridinium, a substituted or unsubstituted pyrimidinium, a substituted or unsubstituted pyrrolidinium, a substituted or unsubstituted thiazolium, a substituted or unsubstituted triazolium, a substituted or unsubstituted 1,2,4-triazolinium, a substituted or unsubstituted 1,2,3,4-tetrazolinium, phosphonium, sulfonium, uronium, guanidinium, 3-alkyl-1-methylimidazolium, 1-alkylpyridinium, N-methyl-N-alkylpyrrolidinium, 1-methyl-4-alkyl-1,2-triazolinium, 1-methyl-(2, 3 or 4)-alkyltetrazolinium and tetraalkylammonium.

14. The battery of claim 1, wherein said non-aqueous electrolyte further comprises a fluoride.

15. The battery of claim 14, wherein a concentration of said fluoride ranges from 0.001 percent to 50 percents by weight of said electrolyte.

16. The battery of claim 14, wherein said fluoride is in a form selected from the group consisting of HF, $NH_4F$ and KF.

17. The battery of claim 14, wherein said non-aqueous electrolyte further comprises silicic acid.

18. The battery of claim 14, wherein upon electric discharge, anodic dissolution of silicon occurs.

19. The battery of claim 1, wherein said non-aqueous electrolyte further comprises water.

20. The battery of claim 19, wherein a concentration of said water ranges from 0.001 percent to 95 percents by weight of said electrolyte.

21. The battery of claim 1, wherein said non-aqueous electrolyte further comprises silicic acid.

22. The battery of claim 21, wherein a concentration of said silicic acid ranges from 0.001 percent to 70 percent by weight of said electrolyte.

23. The battery of claim 1, wherein upon electric discharge, anodic dissolution of silicon occurs.

24. The battery of claim 1, wherein at least one of said anode and said cathode comprises a catalyst layer.

25. The battery of claim 1, wherein said cathode is an air cathode.

26. The battery of claim 25, wherein said cathode comprises a catalyst layer.

27. The battery of claim 1, wherein said cathode comprises a catalyst layer.

28. The battery of claim 1, further comprising a device for increasing flow of said oxygen.

29. A battery comprising an anode, a cathode, a non-aqueous electrolyte and an electric conduit to allow electric current flow between said cathode and said anode, said anode comprising silicon as fuel, and said cathode comprising oxygen as an oxidant, wherein:

said non-aqueous electrolyte comprises an ionic liquid, said ionic liquid selected from the group consisting of 1-ethyl-3-methylimidazolium:(HF)2F:(HF)3F ("EMI.(HF)2.3F"); and an ionic liquid including an anion selected from the group consisting of an anion having the general formula $[F(FH)_n]^-$, whereas n is an integer ranging from 1 to 4, a perfluoro-1,1-dimethylpropyl alkoxide, a mono-perfluorosulfonate, a di-perfluorosulfonate, $(CF_3)_2PF_4^-$, $(CF_3)_3PF_3^-$ $(CF_3)_4PF_2^-$, $(CF_3)_5PF^-$, $(CF_3)_6P^-$, $SF_5CF_2SO_3^-$, $SF_5CHFCF_2SO_3^-$, $(CF_3SO_2)_2CH^-$, $(SF_5)_3C^-$ and $(O(CF_3)_2C_2(CF_3)_2O)_2PO^-$.

30. The battery of claim 29, wherein said oxygen is derived from ambient air.

31. The battery of claim 29, wherein said silicon is amorphous silicon.

32. The battery of claim 29, wherein said silicon is in a form of a single crystal wafer.

33. The battery of claim 29, wherein said silicon comprises a dopant.

34. The battery of claim 33, wherein said silicon is doped degenerately.

35. The battery of claim 29, wherein said silicon is in a form of a powder.

36. The battery of claim 35, wherein said powder is of an alloy which comprises said silicon and at least one metal in an amount that ranges from 1 to 99 percents by weight of the anode.

37. The battery of claim 35, wherein said powder further comprises a powder of at least one metal in an amount that ranges from 1 percent to 99 percents by weight of the anode.

38. The battery of claim 29, wherein said silicon is in a form of an alloy which comprises at least one metal, and wherein an amount of said at least one metal ranges from 1 to 99 percents by weight.

39. The battery of claim 29, wherein when said non-aqueous electrolyte comprises an ionic liquid, a cation in said ionic liquid is selected from the group consisting of an alkali metal cation, an alkaline earth metal cation, a substituted or unsubstituted imidazolium, a substituted or unsubstituted morpholinium, a substituted or unsubstituted oxazolium, a substituted or unsubstituted piperidinium, a substituted or unsubstituted pyrazinium, a substituted or unsubstituted pyrazolinium, a substituted or unsubstituted pyrazolium, a substituted or unsubstituted pyridazinium, a substituted or unsubstituted pyridinium, a substituted or unsubstituted pyrimidinium, a substituted or unsubstituted pyrrolidinium, a substituted or unsubstituted thiazolium, a substituted or unsubstituted triazolium, a substituted or unsubstituted 1,2,4-triazolinium, a substituted or unsubstituted 1,2,3,4-tetrazolinium, phosphonium, sulfonium, uronium, guanidinium, 3-alkyl-1-methylimidazolium, 1-alkylpyridinium, N-methyl-N-alkylpyrrolidinium, 1-methyl-4-alkyl-1,2-triazolinium, 1-methyl-(2, 3 or 4)-alkyltetrazolinium and tetraalkylammonium.

40. The battery of claim 29, wherein said non-aqueous electrolyte further comprises a fluoride.

41. The battery of claim 40, wherein a concentration of said fluoride ranges from 0.001 percent to 50 percents by weight of said electrolyte.

42. The battery of claim 40, wherein said fluoride is in a form selected from the group consisting of HF, $NH_4F$ and KF.

43. The battery of claim 40, wherein said non-aqueous electrolyte further comprises silicic acid.

44. The battery of claim 40, wherein upon electric discharge, anodic dissolution of silicon occurs.

45. The battery of claim 29, wherein said non-aqueous electrolyte further comprises water.

46. The battery of claim 45, wherein a concentration of said water ranges from 0.001 percent to 95 percents by weight of said electrolyte.

47. The battery of claim 29, wherein said non-aqueous electrolyte further comprises silicic acid.

48. The battery of claim 47, wherein a concentration of said silicic acid ranges from 0.001 percent to 70 percent by weight of said electrolyte.

49. The battery of claim 29, wherein upon electric discharge, anodic dissolution of silicon occurs.

50. The battery of claim 29, wherein at least one of said anode and said cathode comprises a catalyst layer.

51. The battery of claim 29, wherein said cathode is an air cathode.

52. The battery of claim 51, wherein said cathode comprises a catalyst layer.

53. The battery of claim 29, wherein said cathode comprises a catalyst layer.

54. The battery of claim 29, further comprising a device for increasing flow of said oxygen.

\* \* \* \* \*